United States Patent
Borghetti et al.

(10) Patent No.: US 8,140,911 B2
(45) Date of Patent: Mar. 20, 2012

(54) DYNAMIC SOFTWARE TRACING

(75) Inventors: Stefano Borghetti, Rome (IT); Antonio Sgro', Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 12/407,435

(22) Filed: Mar. 19, 2009

(65) Prior Publication Data

US 2009/0241096 A1    Sep. 24, 2009

(30) Foreign Application Priority Data

Mar. 20, 2008 (EP) .................................. 08153052

(51) Int. Cl.
*G06F 11/00* (2006.01)
(52) U.S. Cl. ............. 714/45; 714/25; 714/38.1; 714/39; 714/47.1; 717/128; 717/131
(58) Field of Classification Search .................... 714/25, 714/38.1, 39, 45, 47.1; 717/128, 131
See application file for complete search history.

(56) References Cited

U.S. PATENT DOCUMENTS

| | | | |
|---|---|---|---|
| 6,154,857 A * | 11/2000 | Mann ............................. | 714/30 |
| 7,120,685 B2 | 10/2006 | Ullmann et al. | |
| 2004/0123274 A1* | 6/2004 | Inagaki et al. ................ | 717/128 |
| 2008/0126828 A1* | 5/2008 | Girouard et al. .................. | 714/2 |

* cited by examiner

*Primary Examiner* — Charles Ehne
(74) *Attorney, Agent, or Firm* — D'Ambrosio & Menon, LLP; Usha Menon; Srikant Viswanadhan

(57) ABSTRACT

A method, computer program product and system for dynamically changing a trace level, and optionally the trace size, depending on a recognized critical path. In one embodiment of the invention, a method of dynamic software tracing includes identifying one or more critical patterns of a software code which can influence its execution; allocating a software logging metric to each identified critical pattern; searching for one or more critical patterns in the software code to determine one or more actual critical patterns; and attributing the software logging metric associated with each identified critical pattern to the actual critical pattern to discover areas in the software code that may impact performance.

16 Claims, 2 Drawing Sheets

DYNAMIC SOFTWARE TRACING

PRIORITY

This application is based on and claims priority from European Patent Application No. EP08153052.9 filed on Mar. 20, 2008.

BACKGROUND

Software tracing is a process of logging information about the execution of a computer program. The information obtained may then be used by programmers for debugging purposes and also by technical support personnel to diagnose common problems associated with the software.

SUMMARY

Embodiments of the present invention include a method, computer program product and system for dynamically changing a trace level, and optionally the trace size, depending on a recognized critical path. In one embodiment of the invention, a method of dynamic software tracing includes identifying one or more critical patterns of a software code which can influence its execution: allocating a software logging metric to each identified critical pattern; searching for one or more critical patterns in the software code to determine one or more actual critical patterns; and attributing the software logging metric associated with each identified critical pattern to the actual critical pattern to discover areas in the software code that may impact performance.

The software code may be executed during execution of the actual critical patterns in order to identify the impact on performance of the software code. The software logging metric may be dynamically updated based upon the analysis of the execution of the software code.

In one embodiment of the invention, the method further comprises providing the software logging metric as a trace level or a trace size.

In another embodiment of the invention, the critical patterns may be determined with a pattern recognizer. The critical patterns may be determined from the list consisting of loop recognition, path duration, function call depths, method call depths, and hardware impacts. In one embodiment of the invention, once the pattern recognizer finds the critical pattern or path, every trace call may be evaluated by a dynamic tracer module that filters it depending on whether it came from a critical path or not. Thus, the software may change the trace level, and optionally the trace size, in a dynamic manner and at run-time.

Implementations of the method discussed above may include a computer-implemented method, a system, or a computer program product. The details of one or more embodiments of the invention are set forth in the accompanying drawings and the description below. Other features of the invention will be apparent from the description and drawings, and from the claims.

DETAILED DESCRIPTION

Software problems and bugs can be particularly difficult to debug at runtime, since in a production environment there is typically not enough trace information available. In addition, enablement of traces on a piece of software can have significant impact on performance and result in large quantities of collected data. This in turn can have cost implications on the development and production of software. Embodiments of the present invention relate to a computer program product, and a dynamic and automatic software system and method for enabling trace log level and trace log size on a machine or computer, depending on critical patterns in the software.

In one embodiment of the invention, a preliminary or initial stage involves analyzing the software in order to identify its critical patterns. This can be accomplished by tools such as IBM's Rational Application Analyzer (now integrated in the IBM Rational Software Architect) or any run-time analysis and statistic analysis tool. A critical pattern is intended to include the complex path inside the software code that may impact the functionality of the product itself. It will be appreciated that for different software code the critical patterns may be different for different functionalities. In one embodiment of the invention, a critical pattern is the chain of called functions that operate during execution of the code. In another embodiment of the invention, the critical pattern is the number of relationships between classes, modules etc. In yet another embodiment of the invention, the critical pattern may be the time length of the function or module. As previously indicated, it will be appreciated there are many different critical patterns in a piece of software code that may be experienced during execution of the code.

After a critical pattern has been established, the trace level and trace size during execution of the critical pattern may be dynamically determined at runtime of the software. Therefore, the probability of collecting useful information about the traces and, thereby, identifying an error condition may increase. This in turn may result in improvements relating to serviceability, quality and problem determination activities during the life cycle of a product in a customer environment.

The critical patterns, which are identified with respect to a particular product or software code, may be introduced into an embedded module that may dynamically change traces depending on the runtime execution paths on a given machine. The embedded module will be embedded in any product where trace level and trace size during execution of critical patterns can assist in problem solving. The module will be capable of dynamically changing the trace log level and size depending on the configured critical patterns as will be described in greater detail below.

Figure 1:
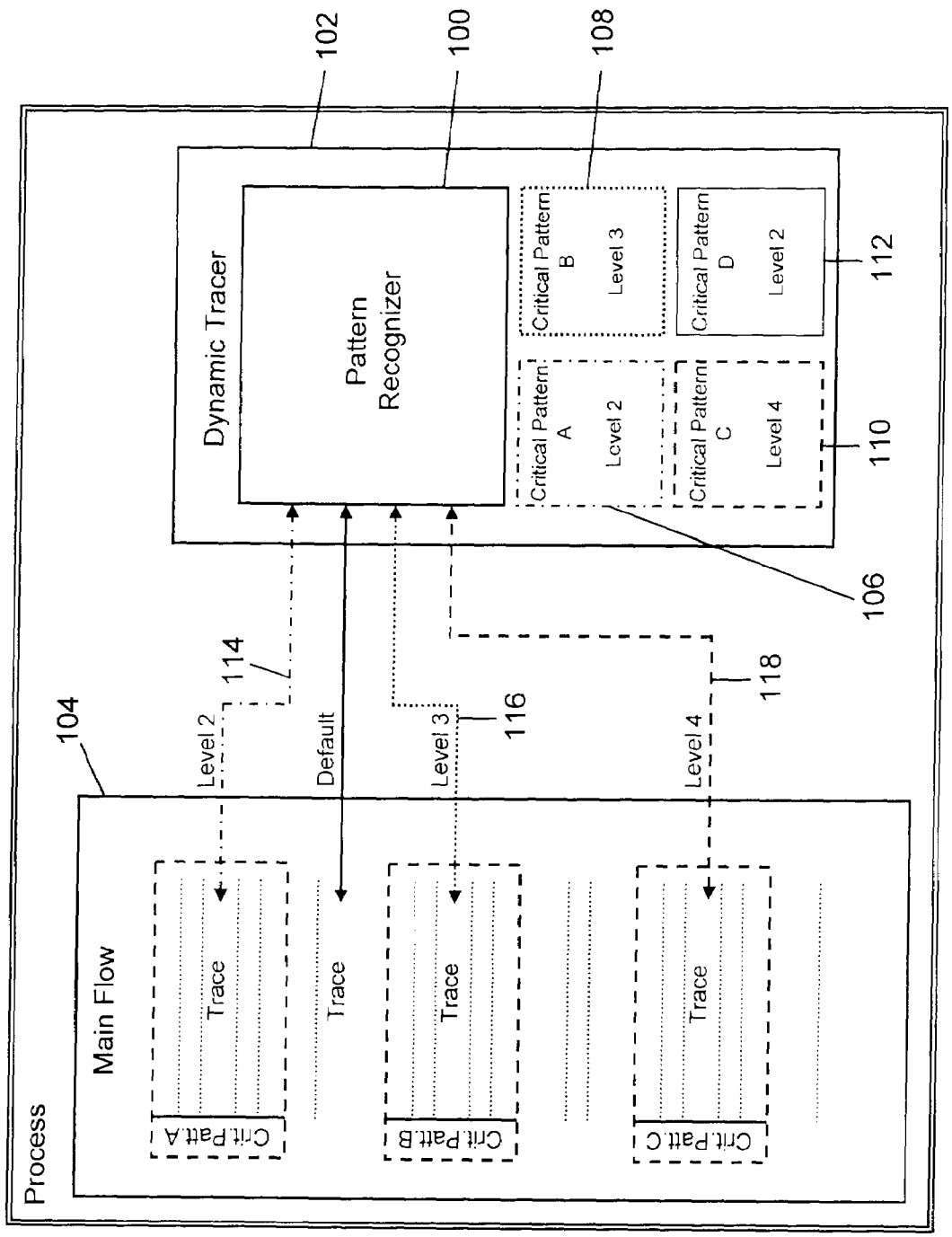
FIG. 1 is a block diagram of an embodiment of the invention.

Referring now to FIG. 1, in one embodiment of the invention, the method may be implemented by means of a module referred to as the pattern recognizer 100 which forms part of a dynamic tracer 102. FIG. 1 also shows the main flow 104 of a computer program to be executed. The dynamic tracer 102 includes a number of critical patterns 106, 108, 110, and 112. Each of the critical patterns is indicated by a letter of the alphabet and includes a level indicator between two and four. The pattern recognizer will use the critical patterns stored in a dynamic tracer in order to identify a critical pattern within the main flow 104, as indicated by arrows 114, 116 and 118. This may result in critical pattern recognition being carried out during execution of the software code.

Once the pattern recognizer finds the critical pattern, every trace call may be evaluated by the dynamic tracer 102 in order to establish if the critical pattern is a recognized critical pattern or not. This results in the software changing the trace level (and optionally trace size) in a dynamic way at runtime. In one embodiment of the invention, this may be achieved by an embedded module in the software that analyzes the stack traces, that is, the functions that are executed, during the software-program execution. It stores the functions that are called and information relating to when they are called in order to find the critical patterns. The trace level measure (see level indicators associated with critical patterns) will then be communicated to the product (or software) modules. In one embodiment (see FIG. 1), the pattern recognizer may set the traces back to the default value (i.e. low trace level), then when a critical pattern is identified in the code, the trace value changes from a default value to a higher value.

The pattern recognizer is a software module that implements a software profile analysis. In one embodiment, the critical pattern recognition may be based on a multilevel categorization. A different trace level may be associated with each pattern belonging to a different category and/or based on the complexity or other specific software criticality relevant factors.

In one embodiment of the invention, the pattern categories may include the following:

Loop recognition: This may be important to avoid certain loops iterating too many times, which can slow down execution of the program. This may be referred to as the category A pattern category and equate to high criticality and a high initial trace level.

Path duration: Real-time software should ideally not spend too much time in specific branches of code as delays may occur. This may be referred to as the category B pattern category and equate to medium criticality and a medium initial trace level.

Function and/or method call depths: This could give rise to a significant level of fragmented code which can impact many execution parameters. This may be referred to as the category C pattern category and equate to low criticality and a low initial trace level.

Different trace levels could be associated with different instances of the same pattern depending on particular parameters or values. In one embodiment, a loop recognition pattern may produce different trace levels depending on the number of recognized iterations. Some categories could be affected by external factors that could invalidate the criticality of the pattern itself. In one embodiment, the "path duration" may be affected by hardware type and/or system workload. The pattern recognizer may be provided with the ability to collect relevant system static and dynamic metrics and make changes to the criticality parameters based on these metrics. Examples of static and dynamic metrics include hardware configurations, CPU usage, memory usage etc. This may enable the pattern recognizer to implement a feedback mechanism that allows a dynamic tuning of the pattern category and the level associated with it.

The following examples are intended to aid the comprehension of the general concepts of the present invention and are not intended to be limiting the scope of the invention.

Example 1 relates to a runtime critical pattern based on the most executed portion of code. The profiling module uses different techniques to recognize the executed portion of code, in particular to recognize untested branches. In the present invention, this could be accomplished by analyzing the stack. The pattern recognizer rule will be recognition of a particular stack sequence occurring more than n times in a given time interval. If this occurs, all the involved functions in the identified stack sequence can be considered as critical due to the frequency of execution. As an example, during the execution of the pattern recognizer a stack sequence fn(0), fn(1), fn(2), fn(3), fn(4), fn(5) is identified as critical. From this point, a high level will be assigned for traces associated with the involved functions until the current stack sequence matches the critical one. In other words, a stack identified as fn(0), fn(1), fn(2), fn(3), fn(6), fn(5) will have a high trace level assigned only to fn(0), fn(1), fn(2), fn(3) and not to functions associated with the rest of the stack (i.e. fn(6), fn(5)) because these do not match the expected critical stack. There are some static relationships between classes that are a cause of potential problems, for example a specific flow that goes through five classes. When the module finds this critical flow (pattern) it can increase the trace level.

Example 2 relates to a runtime critical pattern based on the amount of time a function or method spends along its code path. The pattern recognizer rule will be recognition of the fact that a functional method spends more than a given amount of time to be executed. If this occurs, all the involved functions or methods in the execution path can be considered critical as they could result in performance problems. During the execution of the code the pattern recognizer identifies as critical the function f(n), then all the functions following f(n) in the stack will have a high trace level.

Example 3 relates to a static critical pattern based on the relationship complexity between a set of classes. In this case the pattern recognizer rule will be a static rule with the list of critical classes. The pattern recognizer will then assign a high trace level to any of these critical classes.

Figure 2:
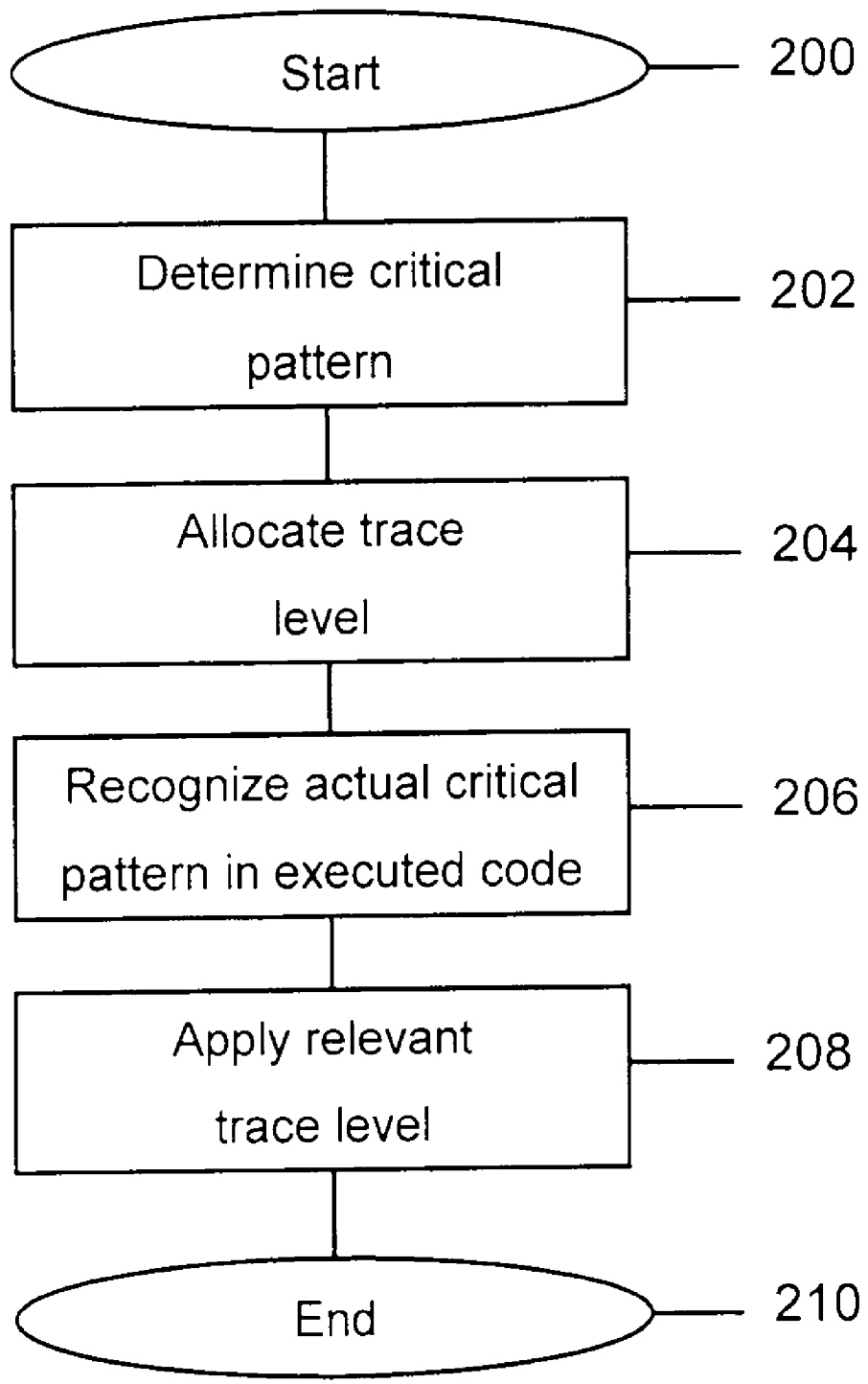
FIG. 2 is a flow chart of another embodiment of the invention.

Referring now to FIG. 2, in one embodiment of the method, the process starts at step 200. At step 202 one or more critical patterns, in a particular code to be executed, are identified. At step 204 each of the critical patterns may be allocated a trace level. At step 206 a pattern recognizer analyses the code to recognize and determine actual critical patterns in the executed code. These are recognized by comparison with the critical patterns identified above. A relevant trace level is applied to each of the actual critical patterns and is identified in the executed code at step 208. The process ends at step 210. It will be appreciated that trace level is one metric that can be allocated to the critical patterns and subsequently the actual critical patterns identified in the code, although others such as trace size may also be used.

In one embodiment of the invention, all tracing can be carried out in a proactive way, because it can be automatically enabled once a specific pattern is recognized. The probability of collecting useful information about tracing and catching an error condition may increase. This may improve serviceability, quality and problem determination activities during the life cycle of a product in a customer environment. The term critical patterns is intended to include critical paths, classes, sequences and any other appropriate type of event which might impact trace level and size or any other software logging metric.

Exemplary methods, systems, and computer program products for dynamic software tracing are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computerusable program code embodied in the medium.

Any combination of one or more computer usable or computer readable media may be utilized. The computer-usable or computer-readable medium may be a non-transitory medium, for example but not limited to, an electronic, magnetic, optical, electromagnetic, infrared, or semiconductor system, apparatus, device, or may be a transitory propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a non-transitory computer-usable or computer-readable medium may be any medium that can contain or store the program, while a transitory computer-usable or computer-readable medium may be any medium that can communicate, propagate, or transport the program for use by or in connection with the instruction execution system, apparatus, or device. The transitory computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations of methods, apparatus (systems) and computer program products according to embodiments of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

It will be appreciated that examples other than those described above may exist, which fall within the scope of the present invention. For example, the steps may take place in different orders and by different modules. Also most of the description relates to runtime analysis, but it will be appreciated that static analysis is equally applicable to the present invention. It should also be understood that the inventive concepts disclosed herein are capable of many modifications. To the extent such modifications fall within the scope of the appended claims and their equivalents, they are intended to be covered by this patent.

The invention claimed is:

1. A method of dynamic software tracing, the method comprising:
    identifying one or more critical patterns of a software code which can influence its execution;
    allocating a software logging metric to each identified critical pattern;
    searching for one or more critical patterns in the software code to determine one or more actual critical patterns; and
    attributing the software logging metric associated with each identified critical pattern to the actual critical pattern to discover areas in the software code that may impact performance,
    wherein the critical patterns are determined from the list consisting of loop recognition, path duration, function call depths, method call depths, hardware impacts, a number of relationships between classes or modules, and a sequence of functions being executed more than a predetermined number of times in a specified time interval.

2. The method of claim 1, further comprising analyzing execution of the software code during execution of the actual critical patterns in order to identify the impact on performance of the software code.

3. The method of claim 2, further comprising dynamically updating the software logging metric based upon the analysis of the execution of the software code.

4. The method of claim 1, further comprising providing the software logging metric as a trace level or a trace size.

5. The method of claim 1, further comprising determining the critical patterns with a pattern recognizer.

6. A computer program product comprising:
a non-transitory computer readable medium including program instructions for dynamic software tracing and implemented by a computer system, the program instructions for:
identifying one or more critical patterns of the software code which can influence its execution;
allocating a software logging metric to each identified critical pattern;
searching for one or more critical patterns in the software code to determine one or more actual critical patterns;
attributing the software logging metric associated with each identified critical pattern to the actual critical pattern to discover areas in the software code that may impact performance;
analyzing execution of the software code during execution of the actual critical patterns in order to identify the impact on performance of the software code; and
updating the software logging metric if the impact differs from an expected impact.

7. The computer program product of claim 6 further comprising program instructions for dynamically updating the software logging metric based upon the analysis of the execution of the software code.

8. The computer program product of claim 6 further comprising program instructions for providing the software logging metric as a trace level or a trace size.

9. The computer program product of claim 6 further comprising program instructions for determining the critical patterns with a pattern recognizer.

10. The computer program product of claim 6, wherein the critical patterns are determined from the list consisting of loop recognition, path duration, function call depths, method call depths, hardware impacts, a number of relationships between classes or modules, and a sequence of functions being executed more than a predetermined number of times in a specified time interval.

11. The computer program product of claim 6, wherein the critical pattern includes a path impacting a functionality of the computer program product.

12. A system for dynamic software tracing comprising:
a processor;
a computer memory operatively coupled to the processor, the computer memory having disposed therein computer program instructions for storing one or more critical patterns of a software code that can influence its execution, each critical pattern allocated a software logging metric; and
an analyzer for analyzing the execution of the software code during the execution of the critical patterns to determine an impact on performance of the software code,
wherein the software logging metric is updated if the impact differs from an expected impact.

13. The system of claim 12 further comprising a pattern recognizer, the pattern recognizer comprising one or more rules to analyze the software code to identify actual critical patterns in the software code corresponding to the one or more stored critical patterns.

14. The system of claim 13, wherein the pattern recognizer attributes the software logging metric to the actual critical pattern.

15. The system of claim 12, wherein the software logging metric comprises a trace level or a trace size.

16. The system of claim 12, wherein the critical patterns are determined from the list consisting of loop recognition, path duration, function call depths, method call depths, hardware impacts, a number of relationships between classes or modules, and a sequence of functions being executed more than a predetermined number of times in a specified time interval.

* * * * *